J. H. PACE.
CONTROLLING APPARATUS FOR AUTOMOBILES.
APPLICATION FILED APR. 26, 1917.
1,239,949.
Patented Sept. 11, 1917.
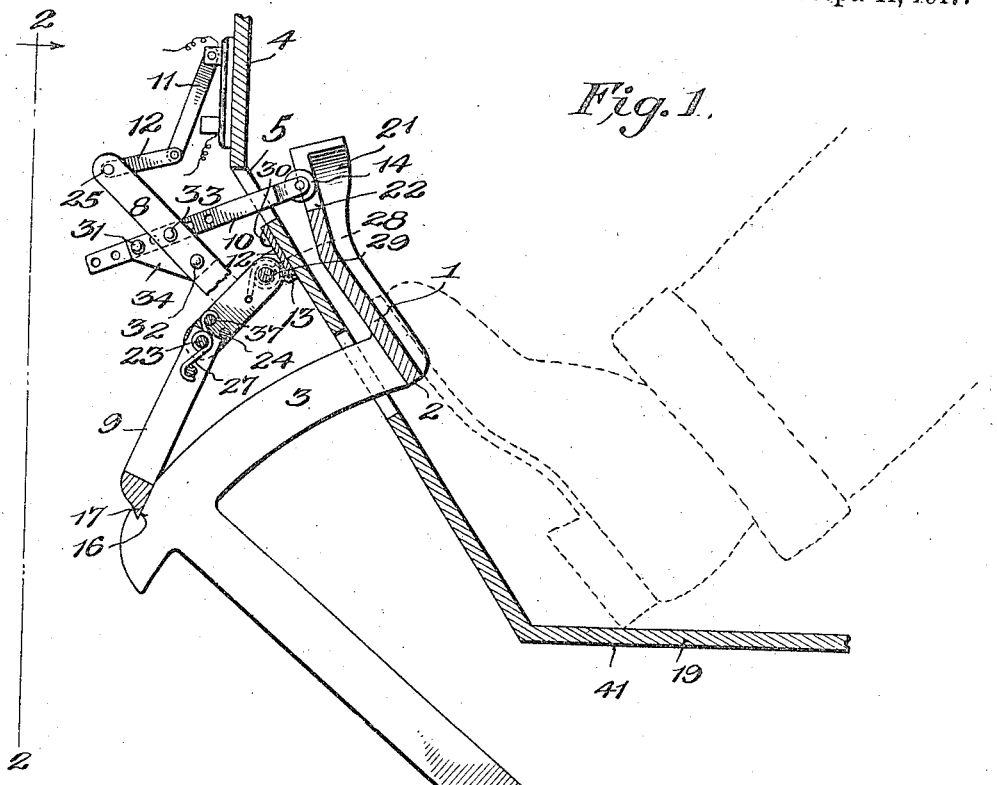
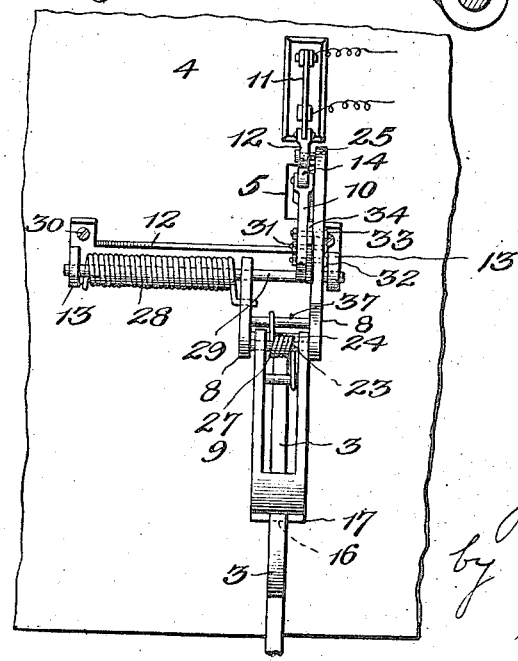
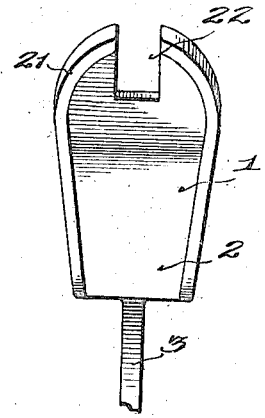
Inventor
James Haralson Pace,
by
C. A. Mason, Attorney

UNITED STATES PATENT OFFICE.

JAMES HARALSON PACE, OF MANSFIELD, GEORGIA.

CONTROLLING APPARATUS FOR AUTOMOBILES.

1,239,949.  Specification of Letters Patent.  Patented Sept. 11, 1917.

Application filed April 26, 1917. Serial No. 164,768.

*To all whom it may concern:*

Be it known that I, JAMES HARALSON PACE, a citizen of the United States, residing at Mansfield, in the county of Newton and State of Georgia, have invented certain new and useful Improvements in Controlling Apparatus for Automobiles, of which the following is a full, clear, and exact description.

This invention relates to controlling apparatus for automobiles, and more particularly to means for holding the clutch controlling pedal and the switch for the ignition current out of action at suitable times, and by the use of simple mechanism.

In driving automobiles or other motor vehicles of any description which are propelled by internal combustion engines, and include a clutch, and change gears, it is customary when descending steep grades to maintain the clutch releasing pedal depressed by the operator's foot, and control the speed of the vehicle by the brake, with the engine in operation. This consumes an unnecessary amount of gasolene, or other fuel, and, moreover, imposes considerable strain upon the muscles of the operator's leg. An important object of the present invention is to save gasolene, to reduce the wear of the moving parts of the engine, and prevent strain upon the nerves of the operator, and upon the muscles which are exerted in holding the clutch out by pressure upon the clutch release pedal, while coasting; also, to obviate the necessity of moving the switch in the ignition circuit to stop the engine, when the power of the latter is not needed.

The above and other important objects are accomplished by the provision of means, operated by a simple change of position of the foot, or otherwise, to hold the clutch releasing pedal depressed and at the same time operate the switch in the ignition circuit, thus disconnecting the vehicle from its motor, and at the same time causing the latter to stop. An important advantage of the described mechanism is that the ignition cutout or switch is operated during the performance of an operation that is necessarily incidental to stopping the car, namely, releasing the clutch by the depression of the usual clutch controlling pedal, and thus the two operations referred to are performed as one.

It is evident that much fuel could be saved in the operation of automobiles by taking out the switch key and holding back the clutch pedal each time the machine is driven down a grade, or on level ground after sufficient momentum was attained to reach the point where it was desired to stop. The act of taking out the switch key cuts out the ignition circuit from the engine, thereby stopping it, and the depression of the clutch release pedal results in permitting the car to run free from connection with the engine. If the clutch pedal were not depressed, the car would soon stop, as its momentum would frequently be insufficient to crank the engine, especially when running along a level. The operations referred to are more or less troublesome,— that is, taking out the switch key and holding back the clutch,—and the driver rarely ever performs them, with the result that an unnecessary amount of gas is burned in descending grades. By the combination of the two operations referred to in one simple and easy operation, as by sliding the foot upward a short distance on the surface of the clutch pedal and then pushing this pedal forward, and by such act cutting off the ignition circuit to stop the engine and locking the pedal in a position to allow the car to run free of the engine, not only is a saving of gasolene accomplished, but likewise the energy of the operator is materially conserved.

The invention has other objects and advantages which will be more clearly apparent from the following specification, when considered in connection with the accompanying drawings in which:

Figure 1 shows a side view, partly sectional, of the mechanism of the present invention with portions of the platform of an automobile;

Fig. 2 is a view in front elevation of the controlling mechanism, and

Fig. 3 is a rear elevation of the clutch pedal, modified for the purposes of the present invention.

The clutch case of an automobile is provided with an opening in which is fulcrumed at 15 the usual clutch release lever having a segmental portion 3 which moves in a slot through the inclined portion of the platform 19 and has rigid therewith the pedal 1. The pedal 1 is, under the present invention, preferably bent angularly at its upper portion and has a slot 22 formed centrally therein. The pedal is also here shown as having a band 21 which partially surrounds it, being about high enough to hide the sole of the shoe up to the point where the pedal inclines upward, where it is higher. This band acts as a guard for the foot.

A bracket 12, having upstanding ears 13 at its ends is secured rigidly to a suitable base beneath the floor of the vehicle, and a rod 29, is supported by these ears which rod also passes through holes in the rear arms of a two-armed member 8, and forms a hinge therefor. The member 8 is secured rigidly, through a triangular plate 34, to a transverse bar 10, the plate 34 and bar 10 having a series of holes to receive pins 31, 32, 33 which secure the bar to the member 8. The rear end of the bar 10 extends through an aperture in the upper forward inclined portion of the platform 19 and is provided with a roller 14, which latter is arranged in line with the slot 22 of the pedal 1, and is about even with the pedal when the pedal is in its locked position, as shown in Fig. 1. The plurality of apertures in plate 34 and rod 10 permit adjustment of the rod with respect to the pedal.

The forwardly extending arms of the member 8, are perforated to receive a hinge pin 23 which connects a pawl 9 to the member 8, said pawl having at its forward end a tooth 16 which is adapted at times to enter a notch 17 in the curved portion of the clutch lever 3, and lock the lever in clutch-releasing position. A spiral spring 27 is coiled about the pin 23, and has its opposite ends secured to suitable abutments, as pins on the member 8 and pawl 9, said spring acting with a normal tendency to move the pawl downward toward the notch 17. The inner end of the pawl is squared off to form an abutment and two pins 24 and 37 extend between the parallel arms of member 8 and are so located as to act as stops for the rear end portion of the pawl, limiting its movement in opposite directions.

When the rod 10 is depressed by the toe, the pawl 9, already forced downward by spring 27 against pin 24, will bear across the path of the notch 17, of pedal segment 3, so that when the notch approaches the point of the pawl they will engage each other as the pedal is let back slightly. This will hold the clutch pedal depressed. When, on the other hand, the lower part of the pedal is moved forward slightly, it will permit the spring 28 to actuate member 8 and pawl 9 upward, thereby taking the point of the pawl out of engagement with the notch 17 in segment of pedal 3.

The upper end of the member 8 is connected through a suitable pivot pin 25 with one end of a link 12 whose opposite end is pivotally connected with the lower end of the movable part 11 of a knife switch, or any other suitable form of switch which is located in the ignition circuit.

The adjustment of the rod 10 in the direction of its length is accomplished by removing the pins 31 and 33, and placing the rod in the desired position so that it will be engaged by the sole of the operator's shoe when the latter covers the slot 22, and the pedal has been depressed the proper distance to permit the pawl to enter the notch 17. These parts should be so adjusted that the roller will be engaged, and the bar 10 and member 8 moved about the pivot 29 as a center, in time to actuate the switch member 11 and open the circuit when the pawl 9 is moved to the position for engaging the notch 17.

Ordinarily, in driving a car, the heel of the operator's foot rests upon the floor of the car at the point 41 or thereabouts, and the toe engages the clutch-releasing pedal at the lower portion thereof, as illustrated in Fig. 1. When it is desired to operate the device herein illustrated, as when descending a hill, the operator will first slip his foot upward on the surface of the pedal until his toe is over the slot 22 and in position to engage the roller 14, and then depress the pedal, thus actuating the movable clutch member to disconnect the engine from the car. As he pushes the pedal forward the roller 14 and bar 10 are carried in the same direction, thus rocking the member 8 upon the pivot 29 and winding up the spring 28, increasing its tension. The described movement of the member 8 carries the pawl 9 from the position it occupied above the path of curved portion of the lever 3, downwardly to cause the tooth 16 to engage the notch 17. The same movement of the parts will, through the connection of the link 12 with the upper end part of the member 8, and the switch member 11, move the latter out of contact with the stationary portion of the switch, thus interrupting the ignition circuit and stopping the engine. The operator then releases the pedal and the usual spring of the latter will, through the engagement of the notched portion 17 with the end 16 of the pawl 9, rock the pawl on its hinge pin 23, and move the squared off end of the pawl into engagement with the stop pin 24. The clutch pedal will then be retained in depressed position, maintaining the disconnection of the clutch parts, and holding the movable switch member of the ignition circuit out with such circuit open. After the car has proceeded the required distance with the clutch out and the engine idle and it is desired to reëstablish the clutch connection between the engine and car and to close the ignition circuit, the operator, by a quick, short, downward movement of the foot upon the pedal will actuate the lever 3 a sufficient distance to disengage the notch 17 from the pawl 9. The spring 28 will then instantly lift member 8, and through it the point of pawl 9, out of the path of notch 17, and by the same movement of member 8 around pin 29 the switch will be closed, permitting the engine to be started by the movement imparted through the car to the engine as the car continues under its previously acquired momentum. The described reverse movement of the parts also restores the bar 10 and roller to its original position where it may be actuated, when desired, to repeat the action just described.

The right is reserved to make any changes in the form, construction, or relative arrangement of the parts shown as may be deemed necessary, but which do not depart from the invention as defined by the scope of the following claims.

Having thus described my invention, what I claim as new and desire to secure by Letters Patent of the United States is:

1. A controlling apparatus for motor vehicles comprising, in combination, mechanism for holding a clutch release pedal in depressed position and for opening a switch in the motor ignition circuit, said mechanism being connected and arranged for operation by a single movement.

2. A controlling apparatus for motor vehicles comprising, in combination, means for holding the clutch release pedal depressed, and means for interrupting the ignition circuit of the motor, said means being so connected as to be capable of simultaneous operation.

3. A controlling apparatus for motor vehiles comprising, in combination, a detent for holding the clutch release pedal depressed, a switch in the ignition circuit of the motor, and connections permitting simultaneous operation of said detent and switch.

4. A controlling apparatus for motor vehicles comprising, in combination, a pivotally supported lever, a pawl connected with one arm of said lever and arranged to engage the clutch releasing lever and hold the latter depressed, a switch in the ignition circuit of the motor, connections between another arm of the first mentioned lever and said switch, and means operable by a single movement to actuate the switch and interrupt the ignition circuit and to move said detent into position for locking the clutch releasing lever depressed.

5. A controlling apparatus for motor vehicles comprising, in combination, a lever adapted to be fulcrumed on said vehicle, a pawl pivotally connected with said lever and arranged to engage the clutch releasing lever and hold the same depressed, a switch in the ignition circuit having connection with another arm of the first mentioned lever, and means, also connected with said arm, and extending in position to be actuated by the operator's foot when the clutch releasing lever is depressed to thereby operate the switch to open the ignition circuit and simultaneously locate the pawl in position for retaining the clutch release lever depressed.

6. A controlling apparatus for motor vehicles comprising, in combination, a bracket for attachment to a suitable support below the floor of the vehicle, a lever fulcrumed to said bracket, a pawl pivoted to one arm of said lever and arranged for engagement with a notch in the clutch releasing lever of the vehicle to hold the last named lever depressed, a switch in the ignition circuit of the motor having a movable part connected with another arm of the first mentioned lever, a rod connected with said arm, a pedal on the clutch releasing lever provided with a slot in alinement with the end of said rod, whereby said pedal may be depressed, with or without actuating said rod, according to the position of the operator's foot.

7. A controlling apparatus for motor vehicles comprising, in combination, a bracket for attachment to a suitable support below the floor of the vehicle, a lever pivoted to said bracket, a pawl pivoted to an arm of said lever and a spring to normally depress said pawl, a switch in the ignition circuit of the motor having its movable member connected with another arm of said lever, yielding means to normally maintain said lever in position for holding the switch closed, and means, operable at the will of the driver of the vehicle, for moving said lever to operate the switch and simultaneously place the pawl in position for engaging and locking the clutch releasing lever of the vehicle in depressed position.

8. A controlling apparatus for motor vehicles comprising, in combination, a lever pivoted below the platform of the vehicle, a pawl pivoted to one arm of said lever, a switch in the ignition circuit of the motor having a movable member connected to the other arm of said lever, a clutch controlling lever having a segmental portion provided with a notch, a pedal connected with said lever and having a slot, a rod connected with an arm of the first mentioned lever and having its end positioned in alinement with said slot and arranged for operation by the foot of the driver as the clutch release pedal is depressed, and yielding means for holding the first mentioned lever in position to maintain the switch closed and the pawl raised out of operative relation to said notch.

9. A controlling apparatus for motor vehicles comprising, in combination, a lever fulcrumed to a support below the floor of the vehicle, a pawl pivoted to one arm of said lever, stop pins for engagement by the rear end of said pawl to limit its movement in opposite directions, a clutch releasing lever having a notch to be engaged by said pawl for holding the lever depressed with the clutch out, a pedal on the clutch release lever having an opening, and means connected with the first mentioned lever and extending in alinement with said opening, said parts being so arranged that the driver's foot in depressing the pedal may be so positioned as to engage said means to move the pawl into operative relation with said notch when the pedal is depressed, or not, at the will of the driver.

10. A controlling apparatus for motor vehicles comprising, in combination, a lever fulcrumed to a support below the floor of the vehicle, a pawl connected with one arm of said lever, a clutch releasing lever having a notch to be engaged by said pawl for locking said lever in depressed condition, a switch in the ignition circuit of the motor connected with the first mentioned lever in such manner that the circuit is interrupted when said lever is actuated, and means for actuating said lever through the act of depression of the clutch release pedal, said pedal being capable of normal operation without actuating said lever, at the will of the driver.

In testimony whereof I have hereunto set my hand this 21st day of April, A. D. 1917.

JAMES HARALSON PACE.

Witnesses:
W. A. SIMMONS,
JOE S. McGARITY.

Copies of this patent may be obtained for five cents each, by addressing the "Commissioner of Patents, Washington, D. C."